US012712601B2

(12) United States Patent
Barton et al.

(10) Patent No.: US 12,712,601 B2
(45) **Date of Patent: *Aug. 18, 2026**

(54) BACKSCATTER DEVICE CERTIFICATE ON-BOARDING FOR SECURE COMMUNICATION

(71) Applicant: Cisco Technology, Inc., San Jose, CA (US)

(72) Inventors: Robert E. Barton, Richmond (CA); Jerome Henry, Pittsboro, NC (US); Indermeet S. Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/807,538

(22) Filed: Aug. 16, 2024

(65) Prior Publication Data

US 2024/0405808 A1 Dec. 5, 2024

Related U.S. Application Data

(63) Continuation of application No. 18/194,435, filed on Mar. 31, 2023, now Pat. No. 12,155,426.

(51) Int. Cl.
*H04B 7/22* (2006.01)
*H04B 7/04* (2017.01)

(52) U.S. Cl.
CPC ........... *H04B 7/04013* (2023.05); *H04B 7/22* (2013.01)

(58) Field of Classification Search
CPC ... H04B 5/77; H04B 7/22; H04B 1/40; H04B 7/04013; H04B 1/10; H04B 5/45; H04B 7/0626; H04B 1/18; H04B 1/525; H04W 4/80; H04W 4/70; H04W 64/00; H04W 4/029; H04W 4/02; H04W 24/08; H04W 24/02; H04W 24/10; H04W 72/0446; H04L 67/12; H04L 5/0048; H04L 2209/805; H04L 5/0053; H04L 27/04; H04L 5/00; H04L 27/0008; H04L 5/0007; H04L 67/10
See application file for complete search history.

(56) References Cited

U.S. PATENT DOCUMENTS

| | | | | |
|---|---|---|---|---|
| 10,951,446 | B2 * | 3/2021 | Kellogg | G01S 13/82 |
| 2020/0000366 | A1 * | 1/2020 | Katabi | G01S 13/765 |
| 2022/0224583 | A1 * | 7/2022 | Rosenthal | H04L 27/02 |
| 2023/0103804 | A1 * | 4/2023 | Zhu | H04B 5/45 375/260 |
| 2024/0098454 | A1 * | 3/2024 | Choukir | H04W 4/029 |
| 2024/0380481 | A1 * | 11/2024 | Henry | H04B 7/22 |
| 2025/0300725 | A1 * | 9/2025 | Elshafie | H04B 5/79 |

* cited by examiner

*Primary Examiner* — Eva Y Puente
(74) *Attorney, Agent, or Firm* — Patterson + Sheridan, LLP

(57) ABSTRACT

In Wi-Fi 8, backscatter devices (BKDs) may be viewed as part of the 802.11 wireless local area network (WLAN). BKDs in a WLAN have limited transmission interactions with a Wi-Fi access point (AP). Onboarding BKDs to the WLAN is described, which allows for the AP and BKD to participate as elements of the same local network, with security controls. The onboarding of the BKD to a WLAN may occur after discovery of the BKD at an AP and includes replacing an Initial Device Identifier (IDevID) on the BKD with a Local Device Identifier (LDevID) in order to provide for secure communications between the BKD and the WLAN.

20 Claims, 6 Drawing Sheets

600

120
AP

605
PROCESSOR

610
MEMORY
CONTROL MODULE 220
ID MODULE 225
615

650

620
STORAGE
LDevID REPOSITORY 621
OTHER 623

630
NETWORK INTERFACE

230 / 235
Tx / RX

150
IDevID REPOSITORY

155
NETWORK

110
NETWORK CONTROLLER

BACKSCATTER DEVICE CERTIFICATE ON-BOARDING FOR SECURE COMMUNICATION

CROSS-REFERENCE TO RELATED APPLICATIONS

This application is a continuation of co-pending U.S. patent application Ser. No. 18/194,435 filed Mar. 31, 2023. The aforementioned related patent application is herein incorporated by reference in its entirety.

TECHNICAL FIELD

Embodiments presented in this disclosure generally relate to providing secure wireless communications in a network. More specifically, embodiments disclosed herein provide for onboarding backscatter devices onto a local network for secure communication.

BACKGROUND

As more devices and items are connected to wireless networks in the form of internet of things (IOT) devices, wearable devices, sensors, monitors, and other devices, providing power and communication to these devices is an increasing challenge. Some devices such as backscatter devices (BKDs) may utilize ambient power to harvest energy from ambient sources, including radio frequency (RF) energy, to provide power for the various functions of the BKD. For example, a sensor may harvest RF energy to perform a sensing function and to communicate in a network via communication frames, etc.

In many cases, the BKDs are small devices that have limited functions and limited power sources. These limitations often make onboarding the BKDs to a local network and providing secure communications to and from the BKDs a challenge.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
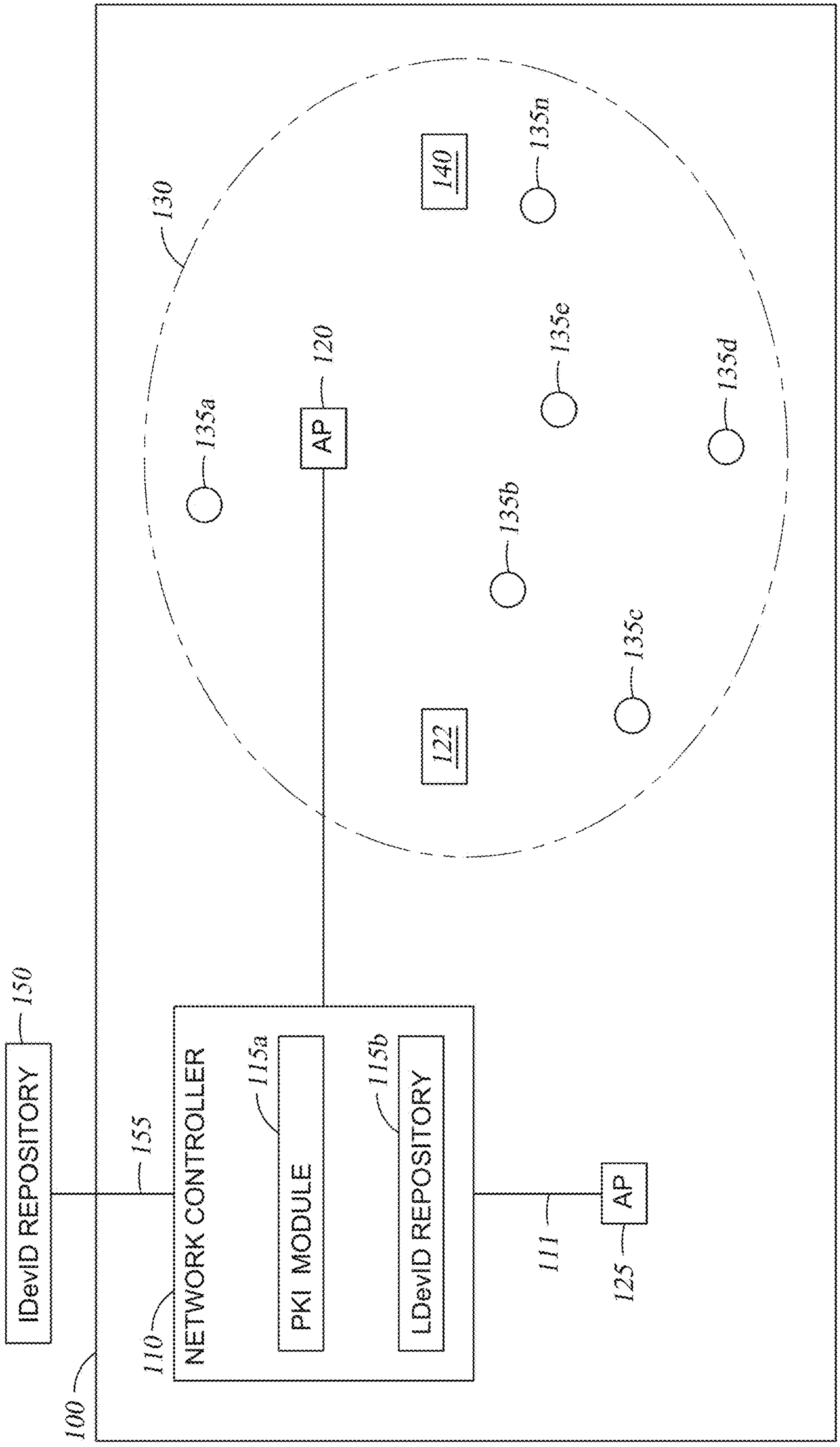
FIG. 1 illustrates a network, according to one embodiment described herein.

One embodiment includes a method. The method includes detecting a backscatter device (BKD) at an access point (AP), validating an identity of the BKD using an initial device identifier (IDevID) at the BKD, and onboarding the BKD to a local network. Onboarding the BKD to the local network may include energizing the BKD to provide sufficient energy for a certificate enrollment process to be completed and replacing the IDevID with a different device identifier based on the certificate enrollment process. The method also includes, upon receiving a success message from the BKD at the AP, entering a normal communication state with the BKD in the local network.

One embodiment includes an access point (AP). The AP may include: a processor, and a memory including instructions which, when executed on the processor, performs an operation. The operation may include: detecting a backscatter device (BKD), validating an identity of the BKD using an initial device identifier (IDevID) at the BKD, and onboarding the BKD to a local network. Onboarding the BKD to the local network may include energizing the BKD to provide sufficient energy for a certificate enrollment process to be completed and replacing the IDevID with a different device identifier based on the certificate enrollment process. The operation also includes, upon receiving a success message from the BKD, entering a normal communication state with the BKD in the local network.

One embodiment includes a non-transitory computer-readable storage medium having program instructions embodied therewith. The program instructions are executable by a processor to perform an operation. The operation may include: detecting a backscatter device (BKD) at an access point (AP), validating an identity of the BKD using an initial device identifier (IDevID) at the BKD, and onboarding the BKD to a local network. Onboarding the BKD may include energizing the BKD to provide sufficient energy for a certificate enrollment process to be completed and replacing the IDevID with a different device identifier based on the certificate enrollment process. The operation also includes, upon receiving a success message from the BKD at the AP, entering a normal communication state with the BKD in the local network. Other embodiments of this aspect include corresponding computer systems, apparatus, and computer programs recorded on one or more computer storage devices, each configured to perform the actions of the operations.

EXAMPLE EMBODIMENTS

As BKDs become more common, it is advantageous to connect these devices into various wireless networks, including Wi-Fi networks. In some examples, various network and other systems transmit energy that BKDs receive and use for their own transmissions. BKDs can be passive (where energy is immediately harvested and used for transmissions) or support energy storage through capacitors or other power storage mechanism that allow energy to be accumulated until enough energy is present to allow a transmission.

In Wi-Fi 8, BKDs may be viewed as part of the 802.11 wireless local area network (WLAN). In this example, BKDs have limited interaction with a Wi-Fi access point (AP). In this sense, the AP powers the BKD through focused beam RF energy and receives/collects the energy/transmissions reflected back by the BKD. In order to allow the AP and BKD to participate as elements of the same local network, security controls should be enacted between these elements.

The system and methods describe herein provide for onboarding BKD to a WLAN after discovery and replacing an Initial Device Identifier (IDevID) on the BKD with a Local Device Identifier (LDevID) in order to provide for secure communications between the BKD and the WLAN.

FIG. 1 illustrates a network 100, according to one embodiment described herein. The network 100 includes a network controller 110 and APs 120 and 125, where the AP 120 and AP 125 are connected to the network controller 110 via connections 111. The connections 111 may include wired or wireless connections which provide network access and control between the network controller 110 and the APs. In some examples, the network 100 is a Wi-Fi WLAN providing network connection to the APs 120 and 125 and various connected client devices. For example, devices **135*a*-135*n* are Wi-Fi devices connected to the AP 120 for network connections in the network 100 and external networks. In some examples, the devices 135*a*-135*n* include a variety of devices such as user devices (e.g., mobile phones, laptops, etc.), IoT devices (e.g., smart devices, etc.), and BKDs. The devices 135*a*-135*n* are part of basic service set (BSS) 130 connected to the AP 120**.

Figure 3:
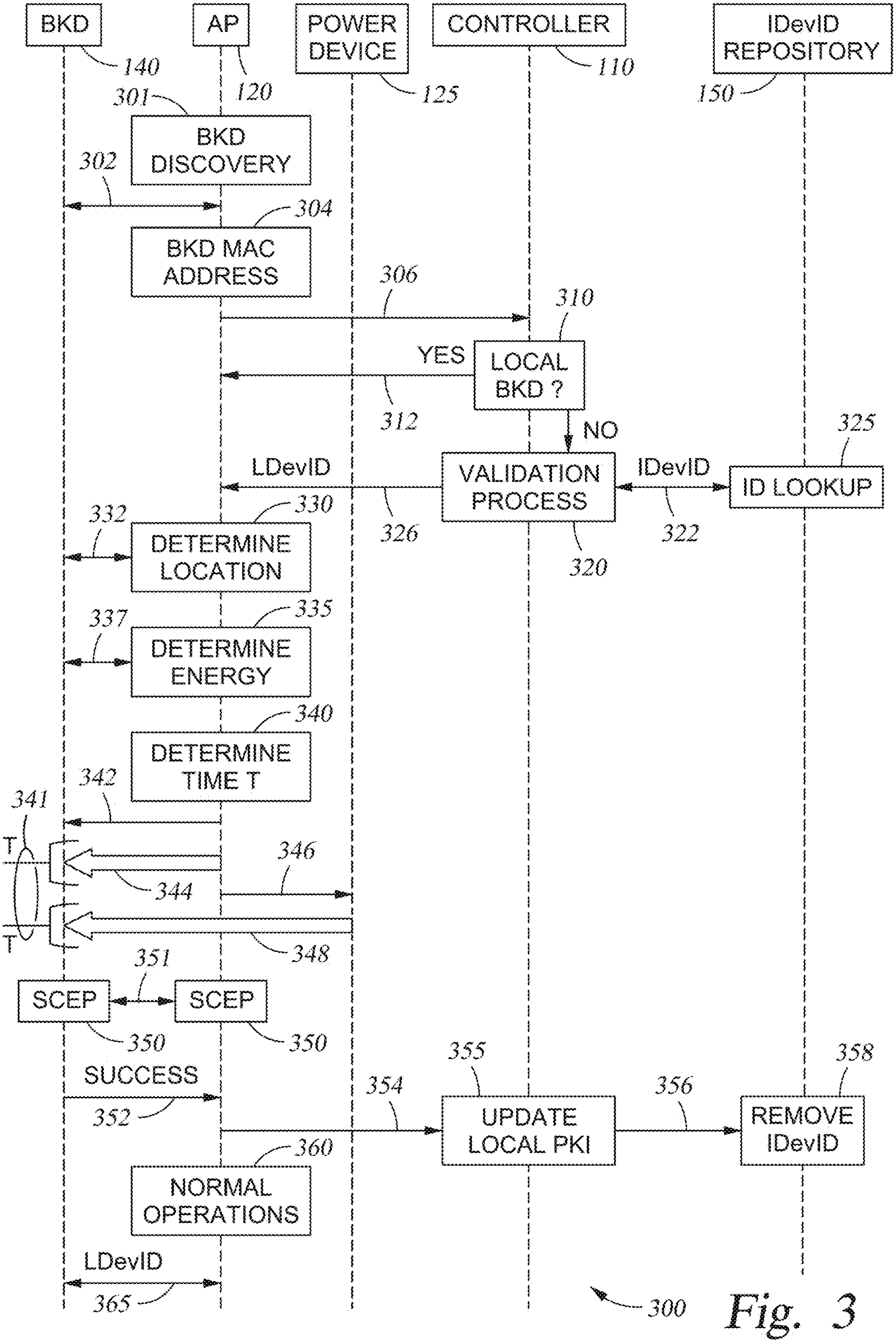
FIG. 3 illustrates a system flow diagram for onboarding a BKD to a local network, according to one embodiment.
Figure 4:
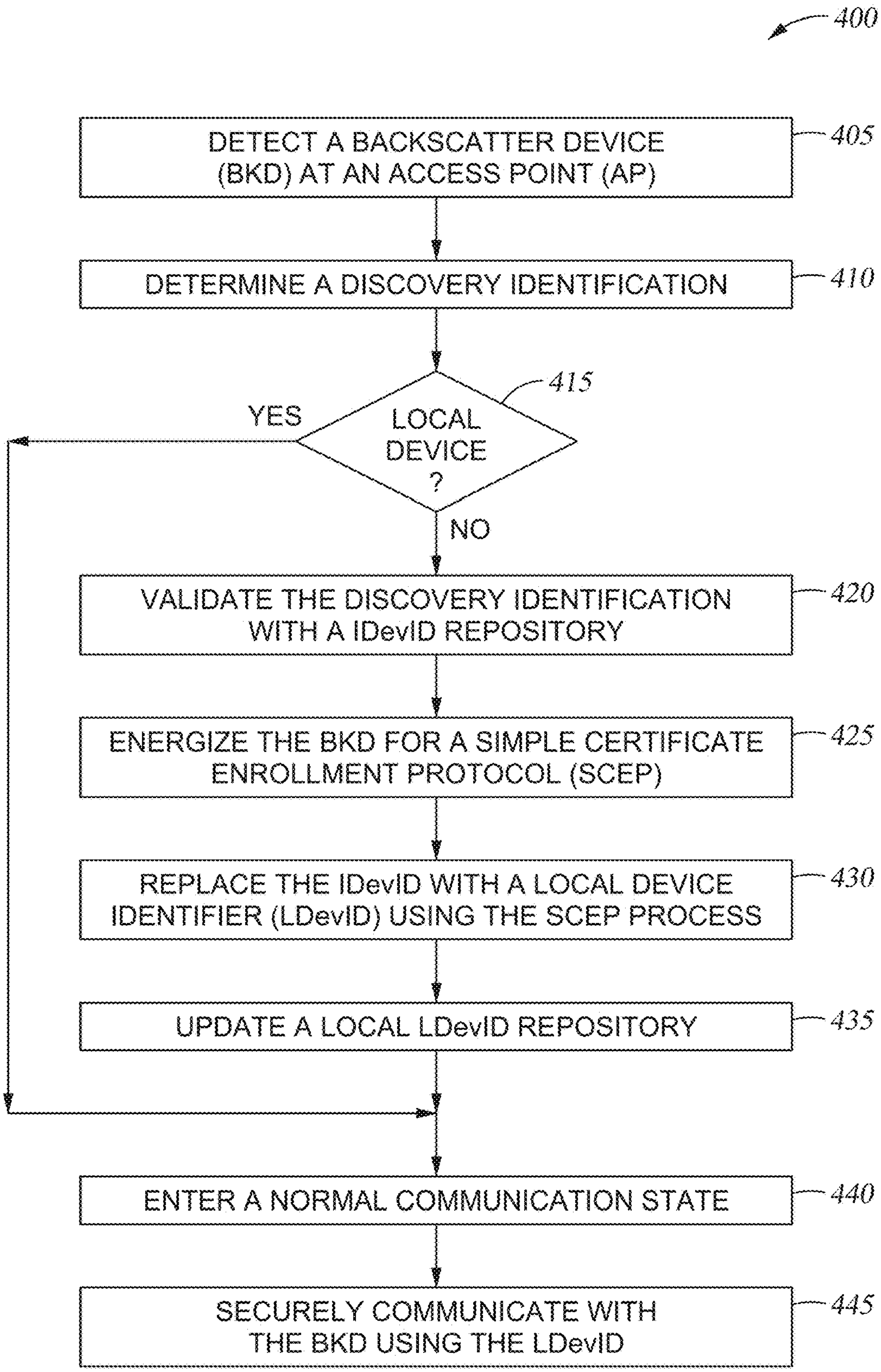
FIG. 4 is a method for onboarding a BKD to a local network, according to one embodiment.
Figure 5:
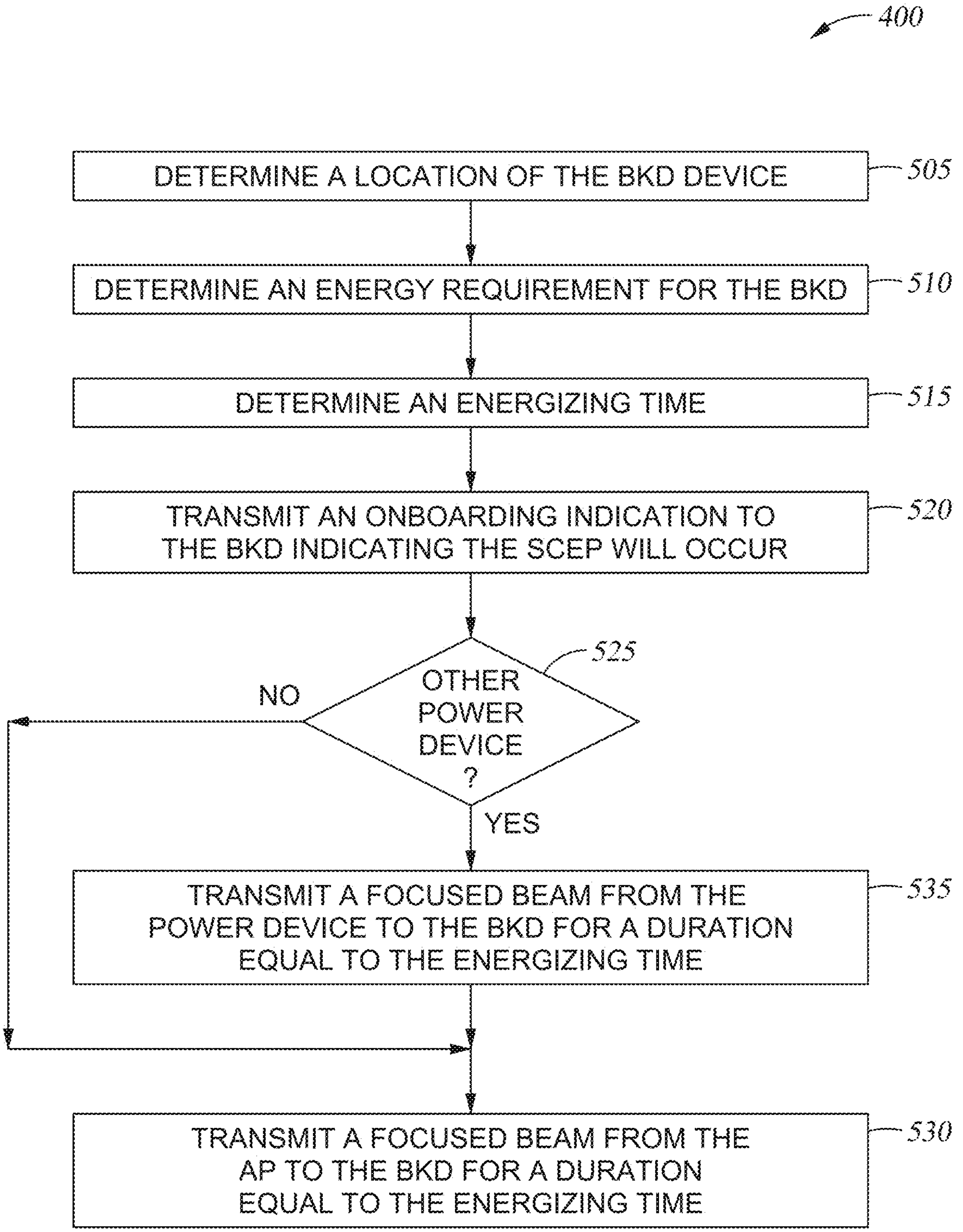
FIG. 5 is a method for energizing a BKD, according to one embodiment.

In some examples, the network 100 also includes a second power device 122, which is discussed in more detail in relation to FIGS. 3-5, and a BKD 140. In one example, the BKD 140 is a device that is connected to the network 100 via the AP 120 (i.e. has proceeded through an onboarding process or other connection process). In another example, the BKD 140 is not connected to the network 100. In this case, the AP 120 and BKD 140 perform the operations described herein in order to onboard the BKD 140 to the network 100 and provide for secure communications between the AP 120 and the BKD 140. In some examples, the BSS 130 and other BSSs in the network 100 (e.g., a BSS associated with the AP 125) form an extended service set in the network 100. For ease of illustration and discussion, the onboarding process for the BKD 140 are described in relation to BSS 130, but may also be performed for an ESS for the network 100 among other service sets, etc.

The AP 120, in conjunction with other network devices such as the network controller 110, performs the processes described in more detail in relation to FIGS. 3-5. In some examples, the AP 120 may perform the operations of the network controller 110 (i.e. the AP 120 includes control modules for the network 100). The network controller 110 includes a public key infrastructure (PKI) module **115*a* for the network 100, where the PKI module 115*a* generates and tracks device IDs for the network 100. The network controller 110 also includes an LDevID repository module 115*b*. The PKI module 115*a* and the LDevID repository module 115*b* generate and track LDevID certificates in the network 100. The PKI module 115*a* also interacts with an external certificate repository such as IDevID repository 150 via external network 155. The IDevID repository 150 may be a manufacturer repository or other similar repository that installs or tracks certificates or IDs for devices such as the BKD 140** (and other client or network devices).

In order to provide secure communications between the network 100 and the BKD 140, a certificate associated with the BKD 140 is verified during a connection/onboarding process with the AP 120. This connection and communication process needs energy at the BKD 140 such that the BKD 140 harvests energy from the AP 120 as shown in more detail in relation to FIG. 2.

Figure 2:
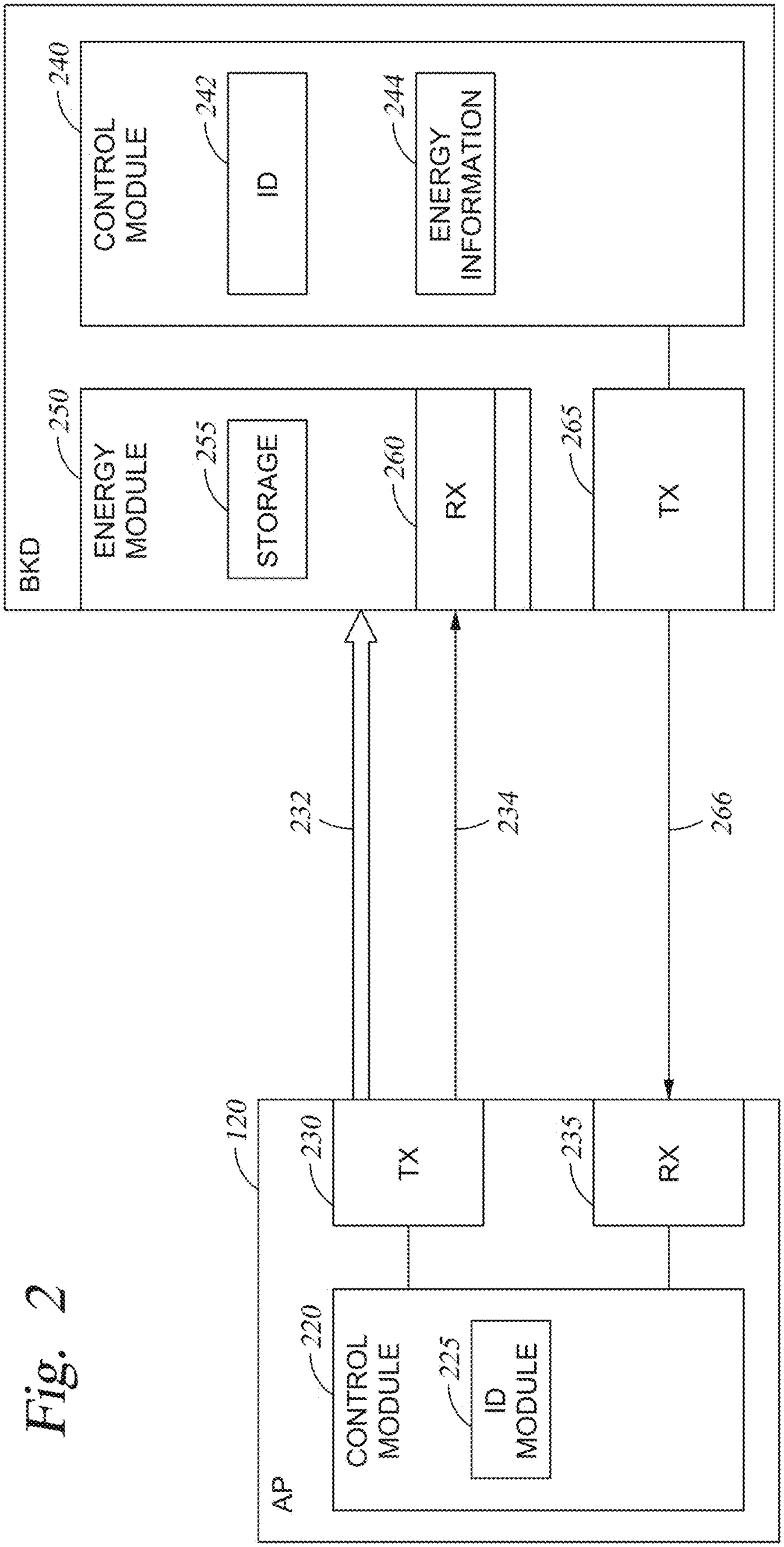
FIG. 2 illustrates interactions between an AP and a BKD, according to one embodiment described herein.

FIG. 2 illustrates interactions between the AP 120 and the BKD 140, according to one embodiment described herein. The AP 120 includes a control module 220 which also includes an ID module 225. The ID module performs various onboarding, verification, and certificate validation processes as described herein. The AP also includes a transmitter (Tx) 230 and receiver (Rx) 235. The BKD 140 includes Rx 260 and Tx 265 where the AP 120 sends transmission signals (Tx signals) 234 to the BKD 140 and receives Tx signals 266 from the BKD 140. In some examples, the various transmitters and receivers in the AP and BKD are collocated as transceivers.

The BKD 140 also includes energy module 250 and storage 255 which harvests energy, such as RF beam 232 transmitted from the AP 120, to provide power for the various functions performed by the BKD 140. In some examples, the energy module 250 stored harvested energy in capacitors or other storage components in the storage 255 in order to build up energy for various energy intensive processes/functions performed by the BKD 140.

The BKD 140 includes control module 240 which includes ID 242 and energy information 244. In some examples, the control module 240, in conjunction with the AP 120, performs a certificate update process, such as Simple Certificate Enrollment Protocol (SCEP), to update or replace the ID 242 with a WLAN based ID. The certificate update process may be a part of an onboarding or other similar process to connect the BKD 140 to the network 100. In some examples, the BKD 140 may perform passive functions, where the Tx signals 234 provide sufficient ambient power for the BKD 140 to send Tx signals 266 (e.g., the BKD 140 reflects signals back to the AP 120). In some examples, some functions and processes, such as the certificate update process, require more power than can be provided in a single set of Tx signals from the AP 120. In this example, the BKD 140 generates and provides energy information 244 to the AP 120 in order to receive sufficient energy to perform a certificate update or other process, as described in relation to FIGS. 3-5.

FIG. 3 illustrates a system flow diagram for onboarding a BKD to a local network, FIG. 4 is a method 400 for onboarding a BKD to a local network, and FIG. 5 is a method 500 for energizing a BKD. For ease of illustration and discussion, the methods 400 and 500 will be discussed in parallel with system flow 300 in FIG. 3. Referring to FIG. 4, method 400 begins at block 405 where the AP 120 detects a BKD. In some examples, the AP 120 detects the BKD 140 in a discovery mode for new or unconnected devices that are within a connection vicinity of the AP 120. For example, in the system flow 300, the AP 120 enters a BKD discovery mode at step 301. The BKD discovery mode may be a part of a general device/client discovery mode at the AP 120 or may be a discovery mode for only BKD and other ambient power devices. The AP 120 may enter into the BKD discovery mode at step 301 on a periodic basis in order to scan and detect BKDs in the vicinity of the AP 120.

Upon detection of the BKD 140, the AP 120 validates an identity of the BKD using an IDevID at the BKD as shown in blocks 410-420 of method 400. At block 410 the AP 120 determines a discovery identification for the BKD. For example, at step 302 in system flow 300, the AP 120 may interrogate the BKD 140 as part of discovery process and request a discovery identification from the BKD 140. The BKD responds with the ID 242 shown in FIG. 2. At step 304, the AP 120 parses or otherwise determines various information from the received ID 242. For example, the AP 120 examines a MAC address of the BKD 140 to determine a global device identifier for the BKD 140.

At block 415, the AP 120 determines, using the discovery identification from the BKD 140 and a local LDevID repository, whether the BKD is connected or previously onboarded to the local network. For example, the AP 120 compares the discovery identification (e.g., ID 242) from the BKD 140 with an LDevID repository on the AP 120. In some examples, the AP 120 may include an LDevID repository for BKDs in the BSS 130 or the network 100 in the ID module 225. In another example, the AP 120 provides the discovery identification to the network controller 110 at step 306 in system flow 300. In this example, the network controller compares the discovery ID to the BKD IDs stored in the LDevID repository module 115*b*. In an example, where the AP 120 or network controller 110 determines that the discovery identification (i.e. the ID 242) is listed in the LDevID repository module 115*b*, the BKD 140 is already onboard/connected to the network 100 and the AP 120 resumes normal operations at block 440 of method 400. The normal operations may include secure communications with the BKD 140, at steps 312 and 314 in the system flow 300.

In an example where the discovery identification is not in an LDevID repository at step 316, the method 400 proceeds to block 420 where the AP 120 or the network controller 110 validates the discovery identification with an IDevID repository. For ease of discussion, the steps 310-326 of system flow 300 are shown as being performed by the network controller 110. In some examples, these steps may also be performed by the AP 120 directly (e.g., the AP 120 acting as a network controller for the network 100 or as a BSS controller for the BSS 130, etc.). At steps 320, the network controller 110 performs a certificate validation process with the IDevID repository 150 including communications 322. The IDevID repository 150 includes a PKI provided by a manufacturer of the BKD 140 or other secure provider. In some examples, at step 325 the IDevID repository 150 performs a lookup of the discovery ID and provides validation credentials or other information to the network controller 110 indicating the BKD 140 is a valid device. In some examples, the IDevID repository 150 may not validate the BKD 140. This may indicate that the BKD is fake, or a device administrator has not entered the ID or other credentials of the BKD properly. In this example, the BKD may not connect to the network until a correct ID has been entered.

Upon validation of the BKD 140, the network controller indicates the validation to the AP 120 and the AP 120 begins onboarding the BKD 140 to the local network. In some examples, at step 326, the network controller 110 indicates the BKD 140 is validated and provides an LDevID certificate for installation on the BKD 140. In some examples, the LDevID is generated by the PKI module 115*a* for the network 100. In another example, the AP 120 may generate the LDevID for the BKD 140.

The AP 120 onboards the BKDs at blocks 425-435 of method 400. For example, at block 425 the AP 120 energizes the BKD 140 to provide sufficient energy for a SCEP or other similar process to be completed between the AP 120 and the BKD 140. In some examples, the AP 120 energizes the BKD 140 according to method 500 of FIG. 5. At block 505, the AP 120 determines a location of the BKD 140. For example, at step 330 the AP 120 performs a location process including communicating with the BKD 140 at step 332 to locate the BKD 140 in relation to the AP 120.

At block 510 the AP 120 determines an energy requirement for the BKD 140 to complete the SCEP process. For example, at step 335 the AP 120, via communications with the BKD 140 at step 337, determines an energy amount needed for the BKD 140 to perform the SCEP process. In some examples, the BKD 140 provides various communication frames to the AP 120 indicating the energy required, a current amount of power in the storage 255, and other information related to ambient power capabilities at the BKD 140. At block 515, the AP 120 determines, based on the location and the energy requirement, an energizing time and at block 520 transmits an onboarding indication to the BKD indicating the SCEP will occur. In some examples, at step 340 the AP 120 determines the amount of time (T 341) the RF beam 232 shown in FIG. 2 needs to transmit to the BKD 140 in order to meet the energy requirement for the SCEP process. At step 342, the AP 120 indicates the SCEP process including RF beam transmission will begin. In some examples, a second power device, such as the second power device 122 may also transmit an RF beam or RF energy to the BKD 140. For example, another AP, reconfigurable intelligent surfaces (RIS) device, or other RF device in the network 100 may also transmit harvestable RF energy to the BKD 140.

At block 525, the AP 120 determines whether a second or other power device is available. In an example where a second power device is not available the AP 120 proceeds to block 530 where the AP 120 transmits a focused RF beam to the BKD for a duration equal to the energizing time. For example, the AP 120 transmits an RF beam to the BKD 140 at step 344. In an example where a second power device is available, method 500 proceeds to block 535 where the AP 120 causes the second device to transmit the focused RF beam to the BKD for the energizing time. For example, the second power device 122 transmits an RF beam to the BKD 140 at step 348 in response to a control signal received from the AP 120 at step 346. In some examples, both the AP 120 and the second power device 122 may both transmit RF beams to the BKD 140 at steps 344 and 348.

When the energizing time T 341 has elapsed, the BKD 140 has sufficient energy to perform a SCEP process as shown in steps 350 and 351. For example, at block 430 of the method 400, the AP 120 causes the BKD 140 to replace the IDevID (i.e. the ID 242) with the LDevID using the SCEP process or other similar process. At step 352 the BKD 140 indicates a completion of the SCEP process via a success message sent to the AP 120. At block 435, upon receiving the success message from the BKD 140, the AP 120, updates a local LDevID repository with the LDevID of the BKD 140 and enters a normal communication state with the BKD in the local network at block 440. In some examples, the AP 120 updates a local LDevID repository on the AP 120 or indicates the successful onboarding to the network controller 110 at step 354 which updates the local PKI at step 355. In some examples, at steps 356 and 358 the IDevID repository 150 is informed of the certificate replacement at the BKD 140 and removes the IDevID of the BKD 140 from the IDevID repository 150.

At block 445, the BKD 140 securely communicates with the BKD 140 using the LDevID via encryption and trust parameters in the network 100. For example, at step 360, the AP 120 enters normal operations (e.g., exits a discovery and onboarding mode) and communicates with the BKD 140 at step 365 using the installed LDevID at the BKD 140.

Figure 6:
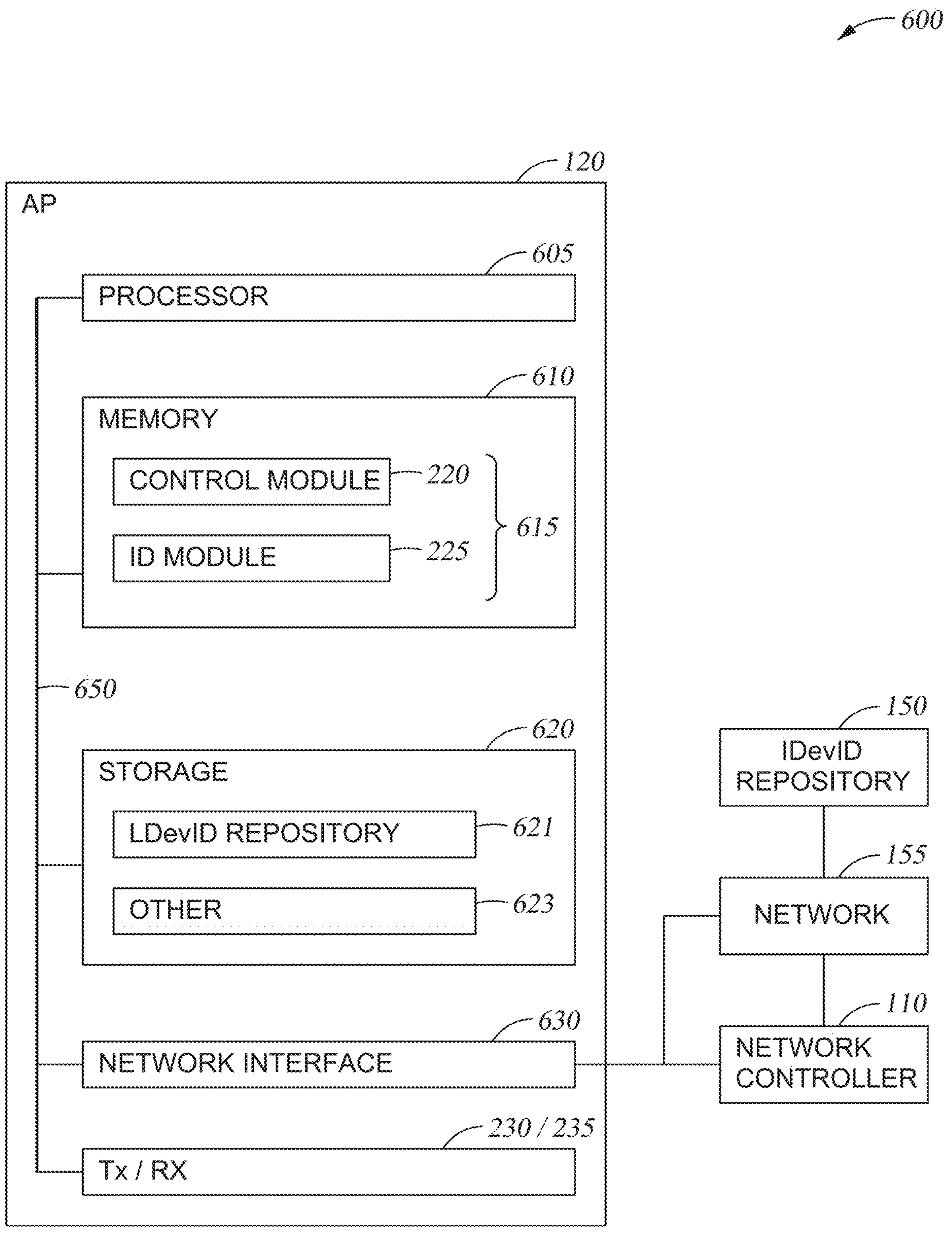
FIG. 6 is a block diagram of an Access Point to provide for onboarding a BKD, according to one embodiment.

FIG. 6 is a block diagram of an AP 120 to provide for onboarding a BKD, according to one embodiment. Arrangement 600 may include AP 120 configured to execute the various functions of the controllers described herein. The AP 120 is shown in the form of a general-purpose computing device, but may include a server and/or application executing on a cloud network. The components of AP 120 may include, but are not limited to, one or more processing units or processors 605, a system memory 610, a storage system 620, network interface 630 connecting the AP 120 to external network 155 and network controller 110, Tx 230 and Rx 235, and a bus 650 that couples various system components including the system memory 610 and storage system 620 to processors 605 along with various input/output components (not shown). In other embodiments, arrangement 600 is distributed and includes a plurality of discrete computing devices that are connected through wired or wireless networking.

Bus 650 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

AP 120 typically includes a variety of computer system readable media (e.g., a non-transitory computer-readable storage medium). Such media may be any available media that is accessible by AP 120, and it includes both volatile and non-volatile media, removable and non-removable media.

System memory 610 can include computer system readable media in the form of volatile memory, such as random access memory (RAM) and/or cache memory. AP 120 may further include other removable/non-removable, volatile/non-volatile computer system storage media. By way of example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 650 by one or more data media interfaces. As will be further depicted and described below, system memory 610 may include at least one program product having a set (e.g., at least one) of program modules that are configured to carry out the functions of various embodiments described herein.

AP 120 may further include other removable/non-removable, volatile/non-volatile computer system storage media. In some examples, storage system 620 may be included as part of system memory 610 and may typically provide a non-volatile memory for the networked computing devices, and may include one or more different storage elements such as Flash memory, a hard disk drive, a solid state drive, an optical storage device, and/or a magnetic storage device. For example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 650 by one or more data media interfaces. Storage system 620 may include media for an LDevID repository 621, and other information 623 stored for access and use by the AP 120.

The system memory 610 may include a plurality of modules 615 for performing various functions described herein. The modules 615 generally include program code/program instructions that is executable by one or more of the processors 605. As shown, modules 615 include the control module 220 and the ID module 225. The modules 615 may also interact with each other and storage system 620 to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:

detecting a backscatter device (BKD) at an Access Point (AP);

validating an identity of the BKD using an initial device identifier (IDevID) at the BKD;

onboarding the BKD to a local network by:

energizing the BKD to provide sufficient energy for a certificate enrollment process to be completed;

replacing the IDevID with a different device identifier based on the certificate enrollment process; and upon receiving a success message from the BKD at the AP, entering a normal communication state with the BKD in the local network.

2. The method of claim 1, wherein validating the identity of the BKD further comprises:

determining a discovery identification for the BKD;

determining, using the discovery identification from the BKD and a local device identifier repository, the BKD is not connected to the local network; and validating the discovery identification with a IDevID repository.

3. The method of claim 2, wherein the different device identifier is generated by a public key infrastructure (PKI) module for the local network, and wherein the method further comprises:

upon receiving the success message, updating the local device identifier repository with the different device identifier of the BKD.

4. The method of claim 2, wherein the discovery identification is the IDevId installed by a manufacturer of the BKD.

5. The method of claim 1, wherein onboarding the BKD to the local network further comprises:

determining a location of the BKD;

determining an energy requirement for the BKD to complete the certificate enrollment process;

determining, based on the location and the energy requirement, an energizing time;

transmitting an onboarding indication to the BKD indicating the certificate enrollment process will occur; and wherein energizing the BKD further comprises:

transmitting a focused beam to the BKD for a duration equal to the energizing time.

6. The method of claim 5, wherein a second focused beam is transmitted by a second device in the local network.

7. The method of claim 1, further comprising:

in the normal communication state, securely communicating with the BKD using the different device identifier via encryption and trust parameters.

8. An access point (AP), comprising:

a processor; and a memory comprising instructions which, when executed on the processor, performs an operation, the operation comprising:

detecting a backscatter device (BKD);

validating an identity of the BKD using an initial device identifier (IDevID) at the BKD;

onboarding the BKD to a local network by:

energizing the BKD to provide sufficient energy for a certificate enrollment process to be completed;

replacing the IDevID with a different device identifier based on the certificate enrollment process; and upon receiving a success message from the BKD, entering a normal communication state with the BKD in the local network.

9. The AP of claim 8, wherein validating the identity of the BKD further comprises:

determining a discovery identification for the BKD;

determining, using the discovery identification from the BKD and a local device identifier repository, the BKD is not connected to the local network; and validating the discovery identification with a IDevID repository.

10. The AP of claim 9, wherein the different device identifier is generated by a public key infrastructure (PKI) module for the local network, and wherein the operation further comprises:

upon receiving the success message, updating the local device identifier repository with the different device identifier of the BKD.

11. The AP of claim 9, wherein the discovery identification is the IDevId installed by a manufacturer of the BKD.

12. The AP of claim 8, wherein onboarding the BKD to the local network further comprises:

determining a location of the BKD;

determining an energy requirement for the BKD to complete the certificate enrollment process;

determining, based on the location and the energy requirement, an energizing time;

transmitting an onboarding indication to the BKD indicating the certificate enrollment process will occur; and wherein energizing the BKD further comprises:

transmitting a focused beam to the BKD for a duration equal to the energizing time.

13. The AP of claim 12, wherein a second focused beam is transmitted by a second device in the local network.

14. The AP of claim 8, further comprising:

in the normal communication state, securely communicating with the BKD using the different device identifier via encryption and trust parameters.

15. A non-transitory computer-readable storage medium having program instructions embodied therewith, the program instructions executable by a processor to perform an operation comprising:

detecting a backscatter device (BKD) at an Access Point (AP);

validating an identity of the BKD using an initial device identifier (IDevID) at the BKD;

onboarding the BKD to a local network by:

energizing the BKD to provide sufficient energy for a certificate enrollment process to be completed;

replacing the IDevID with a different device identifier based on the certificate enrollment process; and upon receiving a success message from the BKD at the AP, entering a normal communication state with the BKD in the local network.

16. The computer-readable storage medium of claim 15, wherein validating the identity of the BKD further comprises:

determining a discovery identification for the BKD;

determining, using the discovery identification from the BKD and a local device identifier repository, the BKD is not connected to the local network; and validating the discovery identification with a IDevID repository.

17. The computer-readable storage medium of claim 16, wherein the different device identifier is generated by a public key infrastructure (PKI) module for the local network, and wherein the operation further comprises:

upon receiving the success message, updating the local device identifier repository with the different device identifier of the BKD.

18. The computer-readable storage medium of claim 16, wherein the discovery identification is the IDevId installed by a manufacturer of the BKD.

19. The computer-readable storage medium of claim 15, wherein onboarding the BKD to the local network further comprises:

determining a location of the BKD;

determining an energy requirement for the BKD to complete the certificate enrollment process;

determining, based on the location and the energy requirement, an energizing time;

transmitting an onboarding indication to the BKD indicating the certificate enrollment process will occur; and wherein energizing the BKD further comprises:

transmitting a focused beam to the BKD for a duration equal to the energizing time.

20. The computer-readable storage medium of claim 15, wherein the operation further comprises:

in the normal communication state, securely communicating with the BKD using the different device identifier via encryption and trust parameters.

* * * * *